(12) United States Patent
Sakai

(10) Patent No.: US 8,740,092 B2
(45) Date of Patent: Jun. 3, 2014

(54) IC TAG AND ELECTRONIC APPARATUS

(75) Inventor: Yuji Sakai, Saitama (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 13/531,850

(22) Filed: Jun. 25, 2012

(65) Prior Publication Data

US 2013/0008969 A1    Jan. 10, 2013

(30) Foreign Application Priority Data

Jul. 5, 2011   (JP) .................................. 2011-149464

(51) Int. Cl.
*G06K 19/06*   (2006.01)

(52) U.S. Cl.
USPC .......................................... 235/492; 235/487

(58) Field of Classification Search
USPC .................... 235/380, 375, 487, 492
See application file for complete search history.

(56) References Cited

U.S. PATENT DOCUMENTS

2010/0090805 A1*   4/2010   LIbotte ........................ 340/10.2

FOREIGN PATENT DOCUMENTS

JP        2007-006029 A        1/2007

* cited by examiner

*Primary Examiner* — Karl D Frech
(74) *Attorney, Agent, or Firm* — Sony Corporation of America

(57) ABSTRACT

There is provided an IC tag, including a substrate made of a dielectric material, an antenna pattern disposed on a surface of the substrate, a communication circuit chip connected to one end and other end of the antenna pattern on the substrate surface, which performs transmission processing and/or reception processing of a radio signal, and external circuit connection parts connected to the antenna pattern in a vicinity of the one end and the other end thereof on the surface or a rear surface of the substrate, in which a conductive part having a predetermined area opposes to other conductive part having a predetermined area on an opposed surface at an opposite side of the substrate, and the conductive part on the opposed surface at the opposite side is formed as a pad to be connected to an external circuit.

14 Claims, 6 Drawing Sheets

IC TAG AND ELECTRONIC APPARATUS

CROSS-REFERENCE TO RELATED APPLICATION

The present application claims priority from Japanese Patent Application No. JP 2011-149464 filed in the Japanese Patent Office on Jul. 5, 2011, the entire content of which is incorporated herein by reference.

BACKGROUND

The present disclosure relates to IC tags for performing non-contact communication with a reader/writer and to electronic apparatuses mounted with the IC tag.

IC tags, which perform non-contact communication with an adjacent reader/writer to carry out authentication processing or the like, are widely prevailing. Particularly, so-called passive IC tags, which have no power source such as battery cell in the IC tag itself but operate using the power obtained by receiving radio waves from a reader/writer and accumulated in a capacitor or the like, are prevailing due to its usability.

An IC tag is configured including component parts such as IC chip performing communication processing, mounted on a circuit substrate formed with an antenna pattern for receiving a radio wave from a reader/writer. In order to efficiently receive a radio wave from the reader/writer, the antenna pattern is disposed in a relatively large area in a coil shape on the circuit substrate. Generally, in a central area enclosed by the coil-shaped antenna pattern, component parts such as an IC chip, a capacitor and the like are disposed. When carrying out authentication processing using an IC tag, for example, a piece of information stored in a memory of the IC chip is transmitted to a reader/writer, and a piece of information transmitted from the reader/writer is written on the memory of the IC chip; thus communication processing is carried out by the IC tag itself.

Thus, radio communication with a reader/writer is possible by an IC tag itself. For example, electronic money cards, ticket cards, authentication cards and the like, in which a circuit substrate including an IC tag is packaged in a card or the like, are prevailing.

On the other hand, various kinds of electronic apparatuses such as mobile phone terminal in which an IC tag is embedded are also prevailing. In IC tags embedded in the electronic apparatus, basic configuration of the IC tag itself is the same. Some electronic apparatuses embedded with an IC tag perform a certain operation responding to a communication status of the IC tag. For example, it is detected that an IC tag starts communication with a reader/writer, and the power for the electronic apparatus main body is then turned on using the initiation of communication as a trigger.

FIG. 10 is an illustration showing an example of configuration of an IC tag embedded in a conventional electronic apparatus; and FIG. 11 is a cross-sectional view taken along a line A-A in FIG. 10.

A coil antenna 2 including a conducting layer strip, which is laid around in a coil-like shape, is disposed in an outer area of a surface of a rectangular substrate 1 made of resin material. In the example shown in FIG. 10, the coil antenna 2 has a configuration in which the conducting layer is laid around by three turns.

An end 2a of the coil antenna 2 at an outer periphery side is connected to a wiring pattern 2g at a rear surface side of the substrate 1 via a through hole 3b. The wiring pattern 2g at the rear surface side is further connected to a wiring pattern 2d of the coil antenna 2 provided in an inner area of the surface via other through hole 3b. An end 2b of the coil antenna 2 at an inner side is connected to a wiring pattern 2c.

Thus, the wiring pattern 2c and the wiring pattern 2d, which are connected to one end and other end of the coil antenna 2, are connected to an IC chip 4 mounted on the surface of the substrate 1. The IC chip 4 is a chip including a circuit which performs processing of radio communication with a reader/writer. Thus, by connecting the IC chip 4 to the coil antenna 2, non-contact communication with a reader/writer is made possible.

In the example of IC tag shown in FIG. 10, wiring patterns 2e and 2f each branched at a point in a halfway of wiring patterns 2c and 2d connected to the IC chip 4 on the surface of the substrate 1, and the wiring patterns 2e and 2f are connect to pads 5a and 5b on the surface of the substrate 1. The pads 5a and 5b are electrode parts each of which functions as a connection terminal to an external circuit.

The IC tag including the pads 5a and 5b as described above is connected to an external circuit in an electronic apparatus as shown in FIG. 12. That is, the pads 5a and 5b provided to the IC tag are connected to the input terminals 7a and 7b of a rectifier circuit 7 via extension wires 6a and 6b. In the rectifier circuit 7, the input terminals 7a and 7b are connected to a rectifying diode bridge 7c and signals obtained at the input terminals 7a and 7b are transmitted to the rectifying diode bridge 7c via capacitors C1 and C2 and rectified signal is outputted. A capacitor C3 is connected to the rectifying diode bridge 7c at an output side thereof. The signal rectified by the rectifier circuit 7 is supplied to a detection circuit 8.

Receiving an input signal exceeding a predetermined threshold value from the IC tag via the rectifier circuit 7, the detection circuit 8 outputs a detection signal. That is, when the IC tag is positioned close to a reader/writer and receives a signal transmitted from the reader/writer with the coil antenna 2, the detection circuit 8 detects the level of the received signal. By using the detection signal obtained from the detection circuit 8 as a trigger, the electronic apparatus can perform various processing such as start-up of the electronic apparatus itself at a moment of, for example, approximation to the reader/writer.

The capacitors C1 and C2 are for galvanically-isolating the circuit on the IC tag from an external circuit to avoid any influence on the circuit on the IC tag and the external circuit. That is, the coil antenna 2 and the IC chip 4 in the IC tag are configured so as to perform non-contact communication with a reader/writer at a prescribed resonant frequency. Here, if the external circuit is directly connected to the IC tag without being interposed by a capacitor, electrical characteristics such as resonant frequency may be disturbed resulting in a reduction of performance as the IC tag. Therefore, in order to avoid such inconvenient influence, the capacitors C1 and C2 are connected.

Japanese Unexamined Patent Application Publication No. 2007-6029 teaches a configuration of a mobile phone terminal including an IC tag as an example of electronic apparatus which includes an IC tag.

SUMMARY

However, in order to connect the IC tag to an external circuit, when a configuration provided with the capacitors C1 and C2 is adopted as shown in FIG. 12, there is a problem that number of component parts of the external circuit increases and manufacturing cost therefor increases accordingly. Also, there is a problem that since the capacitors C1 and C2 use a space to be disposed on the substrate, the size of the substrate of the external circuit increases accordingly.

The present disclosure has been proposed in view of the above problems. The present disclosure provides an IC tag capable of easily connecting the IC tag to an external circuit, and an electronic apparatus provided with the IC tag.

The IC tag according to an embodiment of the present disclosure includes an antenna pattern disposed on a surface of a substrate made of a dielectric material, a communication circuit chip connected to one end and other end of the antenna pattern on the substrate surface, and external circuit connection parts.

The external circuit connection parts are configured to be connected to the antenna pattern in the vicinity of one end and other end thereof on the surface or the rear surface of the substrate, and conductive parts each having a predetermined area are positioned opposing to each other on the opposed surfaces of the substrate. The conductive parts on the opposed surface at the opposite side are the pads to be connected to an external circuit.

An electronic apparatus according to an embodiment of the present disclosure is an apparatus provided with the IC tag.

The IC tag includes an antenna pattern disposed on a surface of a substrate made of a dielectric material, a communication circuit chip connected to one end and other end of the antenna pattern on the substrate surface, and external circuit connection parts.

The external circuit connection parts are configured to be connected to the antenna pattern in the vicinity of one end and other end thereof on the surface or the rear surface of the substrate, and conductive parts each having a predetermined area are positioned opposing to each other on the opposed surfaces of the substrate. The conductive parts on the opposed surface at the opposite side are the pads.

And the electronic apparatus further includes a rectifying section connected to the pads for rectifying a signal obtained via the pads, and a detection section that detects the signal rectified by the rectifying section.

According to an embodiment of the present disclosure, each of the pads provided to the IC tag for connecting to an external circuit positioned opposing to the conductive part positioned at the opposite side of the substrate also functions as a capacitor. Accordingly, an external circuit connected to the pads is configured in the same state that the external circuit is connected to the antenna pattern and the communication circuit chip being interposed by the capacitors.

According to an embodiment of the present disclosure, since the external circuit connected to the pads of the IC tag is connected to the IC tag being interposed by the capacitor, capacitors for galvanically-isolating the circuit in the IC tag from the external circuit are eliminated. Thus, an effect is obtained such that the circuit is configured simply.

DETAILED DESCRIPTION OF THE EMBODIMENT(S)

Figure 1:
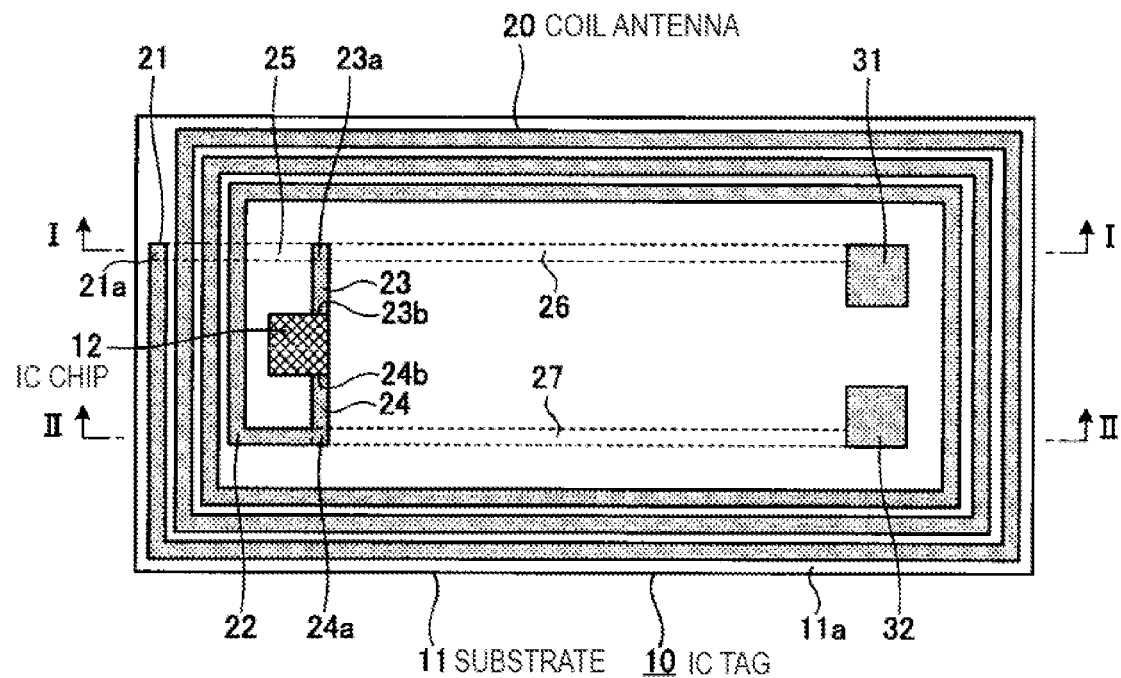
FIG. 1 is a plan view showing an example of a configuration of an IC tag according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described below in the following order.
1. Example of first embodiment
   1-1. Configuration of IC tag (FIG. 1-FIG. 3)
   1-2. Configuration of terminal apparatus mounted with IC tag (FIG. 4)
2. Example of second embodiment
   2-1. Configuration of IC tag (FIG. 6-FIG. 8)
   2-2. Configuration of terminal apparatus mounted with IC tag (FIG. 9)
3. Modification

1. Example of First Embodiment

An example of a first embodiment of the present disclosure will be described below. An IC tag of an example of the first embodiment is an IC tag embedded in a terminal apparatus. A configuration of the IC tag will be described first.

[1-1. Configuration of IC Tag]

Figure 2:
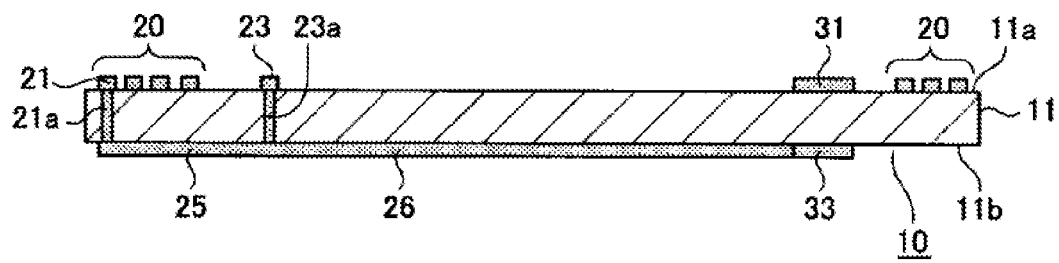
FIG. 2 is a cross-sectional view taken along a line I-I in FIG. 1.
Figure 3:
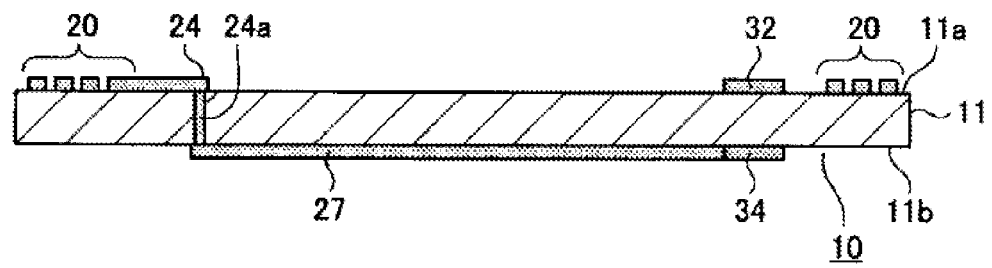
FIG. 3 is a cross-sectional view taken along a line II-II in FIG. 1.

FIG. 1 is an illustration showing an example of a configuration of an IC tag; FIG. 2 is a cross-sectional view taken along a line I-I in FIG. 1; and FIG. 3 is a cross-sectional view taken along a line II-II in FIG. 1.

An IC tag 10 has a coil antenna 20 having a configuration in which a conducting layer strip is disposed being laid around in a coil-like shape in an outer area of a surface 11a of a rectangular substrate 11 made of a resin material as shown in FIG. 1. A dielectric resin material is used for the substrate 11; for example, an epoxy resin substrate is used.

FIG. 1 shows an example of the coil antenna 20 having a configuration of antenna pattern in which the conducting layer is laid around by three turns. However, a configuration of antenna pattern in which a coil or the like is laid around four times or more may be employed.

An end 21 at the outer periphery side of the coil antenna 20 is connected to a wiring pattern 25 located at a rear surface 11b side of the substrate 11 via a through hole 21a as shown in FIG. 2. The wiring pattern 25 at the rear surface 11b is connected to a wiring pattern 23 formed in an inner area of the coil antenna 20 on the surface 11a via another through hole 23a.

Also, an end 22 at the inner side of the coil antenna 20 is connected to a wiring pattern 24 as shown in FIG. 1.

An end 23b of the wiring pattern 23 and an end 24b of the wiring pattern 24 are formed close to each other, and an IC chip 12 is placed on the ends 23b and 24b which are positioned close to each other; thereby the wiring patterns 23 and 24 and the IC chip 12 are connected to each other.

The IC chip 12 is a communication circuit chip including a circuit that processes non-contact radio communication with a reader/writer. The IC chip 12 performs reception processing to receive a radio wave from the reader/writer as well as transmission processing to transmit a radio wave to the reader/writer. When transmitting, a piece of data for authentication stored on a memory in the IC chip 12 is transmitted, and a piece of necessary data contained in the received data is stored in the memory. Thus, by connecting the IC chip 12 to the coil antenna 20, non-contact communication can be achieved with a reader/writer positioned adjacent thereto. The IC chip 12 performs non-contact radio communication with, for example, a 13 MHz wave band.

In this example, a capacitor that accumulates energy of signals obtained by receiving radio waves from the reader/writer and uses the energy as the power is not illustrated in the figure. However, for example, a capacitor used as a power source may be embedded within the IC chip 12. Or a capacitor used as a power source may be provided in a form of wiring pattern formed separated from the IC chip 12 and is connected thereto in parallel. When a capacitor is provided separately from the IC chip 12, for example, a chip-like capacitor is preferred.

The IC tag 10 as an example of the embodiment includes a set of external circuit connection parts. That is, pads 31 and 32 each used as an electrode part to be connected to an external circuit are disposed on the surface 11a of the substrate 11 at the inner side than the coil antenna 20 as shown in FIG. 1. Each of the pads 31 and 32 is formed in a generally square conductive pattern of a predetermined area as shown in FIG. 1, but the pads 31 and 32 are not directly connected to any other wiring pattern on the surface of the substrate 11.

A pad opposite electrode 33 is provided to the rear surface 11b of the substrate 11 opposite to the pad 31 as shown in FIG. 2. Also, a pad opposite electrode 34 is provided to the rear surface 11b of the substrate 11 opposite to the pad 32 as shown in FIG. 3.

Each of the pad opposite electrodes 33 and 34 is a conductive pattern which has area and shape generally identical to those of the pads 31 and 32.

The pad opposite electrode 33 at the rear surface 11b side is connected to the wiring pattern 25 via the wiring pattern 26 at the rear surface side as shown in FIG. 2. As described above, the wiring pattern 25 on the rear surface is connected to the wiring pattern 23 at the surface side via the through hole 23a.

Also, the pad opposite electrode 34 at the rear surface 11b side is connected to the wiring pattern 27 at the rear surface side and the wiring pattern 27 is connected to the wiring pattern 24 at the surface side via the through hole 24a as shown in FIG. 3.

Therefore, the pad opposite electrodes 33 and 34 are in a conduction state with the wiring patterns 23 and 24 attached with the IC chip 12.

Being configured as described above, the pad 31 and the pad opposite electrode 33 are disposed being opposite to each other and being interposed by the substrate 11 of a dielectric material as shown in FIG. 2. Also, the pad 32 and the pad opposite electrode 34 are disposed being opposite to each other and being interposed by the substrate 11 of a dielectric material as shown in FIG. 3. Here, since the substrate 11 is a dielectric substrate made of an epoxy resin, a capacitor is formed by the pad 31 and the pad opposite electrode 33 being opposite to each other and being interposed by the substrate 11. Likewise, a capacitor is formed by the pad 32 and the pad opposite electrode 34 being opposite to each other and being interposed by the substrate 11. Each of the two capacitors formed by the pads 31 and 32 and the pad opposite electrodes 33 and 34 is a capacitor having a minute capacitance. In particular, the capacitance of each capacitor is minute as approximately 3 pF or 6 pF; at most 20 pF or so. The reason why the capacitance value of the capacitor is thus set will be describe below.

The pads 31 and 32, which are external circuit connection parts, are connected to the coil antenna 20 being interposed by capacitors each having a minute capacitance.

[1-2. Configuration of Terminal Apparatus Mounted with IC Tag]

Now, referring to FIG. 4, a configuration of a terminal apparatus 100 connected to the IC tag 10 will be described below.

Figure 4:
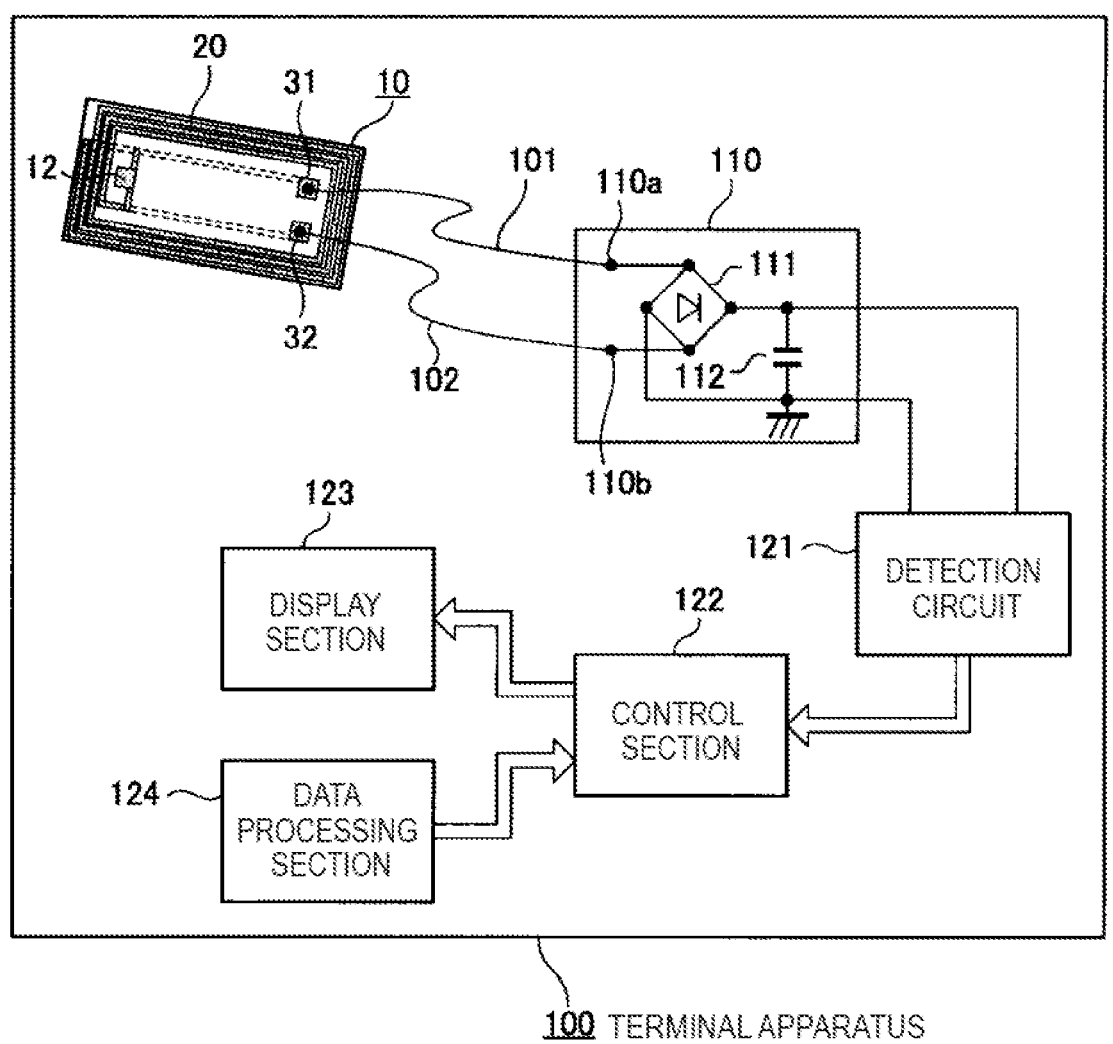
FIG. 4 is a configuration diagram showing an example of a terminal apparatus according to the first embodiment of the present disclosure.

Each of the pads 31 and 32 of the IC tag 10 is connected to input terminals 110a and 110b of a rectifier circuit 110 via extension wires 101 and 102 respectively as shown in FIG. 4. The pads 31 and 32 and the extension wires 101 and 102 are, for example, soldered to connect to each other. The rectifier circuit 110 functions as a rectifying section that rectifies a signal from the IC tag 10, and which connects the input terminals 110a and 110b to a rectifying diode bridge 111 to obtain a signal rectified by the rectifying diode bridge 111. A capacitor 112 is connected to the output side of the rectifying diode bridge 111. The signal rectified by the rectifier circuit 110 is supplied to a detection circuit 121.

When a certain level signal exceeding a predetermined threshold value is inputted from the IC tag 10, the detection circuit 121 functions as a detection section to output a detection signal. That is, when the IC tag 10 is brought closer to a reader/writer and when the coil antenna 20 receives a signal transmitted from the reader/writer, the detection circuit 121 detects the level of the received signal. Based on the detected state, a detection signal is outputted to inform a detection of approximation to the reader/writer and initiation of non-contact communication with the reader/writer.

The detection signal obtained by the detection circuit 121 is supplied to a control section 122 of the terminal apparatus 100. The control section 122 determines approximation to the reader/writer and initiation of communication based on the detection signal supplied from the detection circuit 121 and performs various processing based on the determination. For example, the control section 122 causes a display section 123 to display characters and/or figures representing the initiation of communication with the reader/writer and progression of the communication. Or when a detection signal is supplied from the detection circuit 121 while the terminal apparatus 100 is in a power-off sate or a standby sate, the control section 122 controls to turn on the power. Or the control section 122 sends a certain instruction to a data processing section 124 to carry out a processing corresponding to the initiation of communication with the reader/writer.

Figure 12:
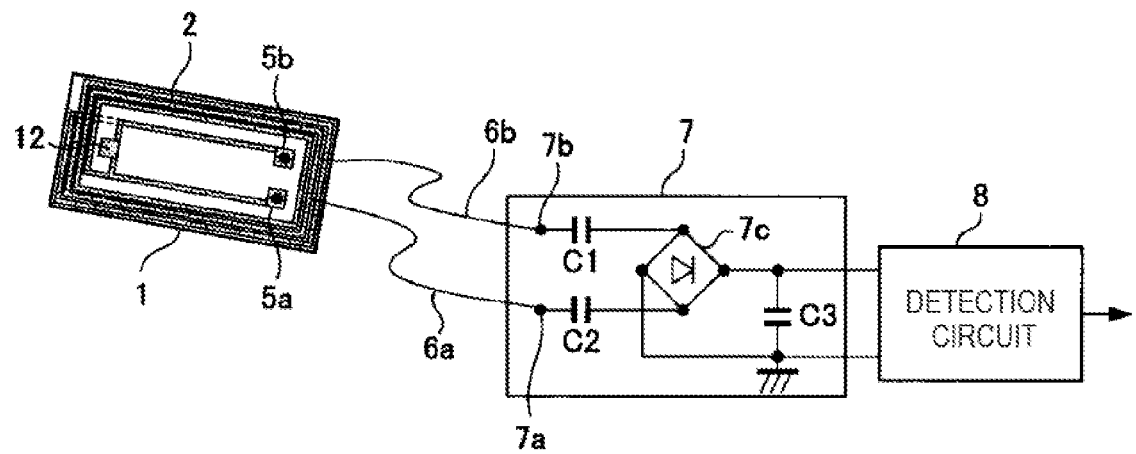
FIG. 12 is a configuration diagram showing an example in which an external circuit is connected to the conventional IC tag.

With the IC tag 10 as an example of the embodiment which is configured as described above, when connecting the IC tag 10 to the circuit on the terminal apparatus as an external circuit using the pads 31 and 32 which are connection terminals for external circuit, no capacitor may be used for separating the IC tag 10 from the external circuit. That is, conventionally, the capacitors C1 and C2 for galvanically-isolating the IC tag from the external circuit were used as shown FIG. 12. However, according to the embodiment, the configuration including a capacitor is achieved by the interaction between the pads 31 and 32 and the pad opposite electrodes 33 and 34 respectively. Therefore, capacitors C1 and C2 are eliminated from the rectifier circuit 110 as the external circuit as shown in FIG. 4 resulting in a simpler configuration thereof accordingly.

As an electrical characteristic of the IC tag, the parts of the pads 31 and 32 provides an effect of capacitor to galvanically-isolate the circuit on the IC tag from the external circuit; and thus, the external circuit is easily connected to the IC tag while ensuring satisfactory performance of the IC tag.

The capacitors in the pads 31 and 32 can be configured by forming the pad opposite electrodes 33 and 34 and the wiring patterns 26 and 27 at the rear surface side of the substrate 11 constituting the IC tag 10. Since the IC tag has a configuration which generally has a wiring pattern at the rear surface side also, the manufacturing cost is little increased for providing the capacitors. Further, the pad opposite electrodes 33 and 34, which are provided to the substrate for obtaining the function as the capacitors, are positioned being overlapped with the pads 31 and 32, unlike the conventional IC tag, the magnetic flux is little prevented from passing through the IC tag by the provided capacitors. Accordingly, the performance of the IC tag is little reduced by the provided capacitors.

The reason why the capacitance of the two capacitors configured with the pads 31 and 32 and the pad opposite electrodes 33 and 34 is set to a minute value of at maximum 20 pF or less is, if the capacitance is set to a value larger than that, the galvanically-isolation between the IC tag and the external circuit is not ensured.

That is, if the capacitor is set to a value larger than 20 pF, when the IC tag carries out non-contact radio communication at 13 MHz wave band, a state substantially identical to a state with no capacitor is generated due to the influence by the IC tag and the external circuit.

Figure 5:
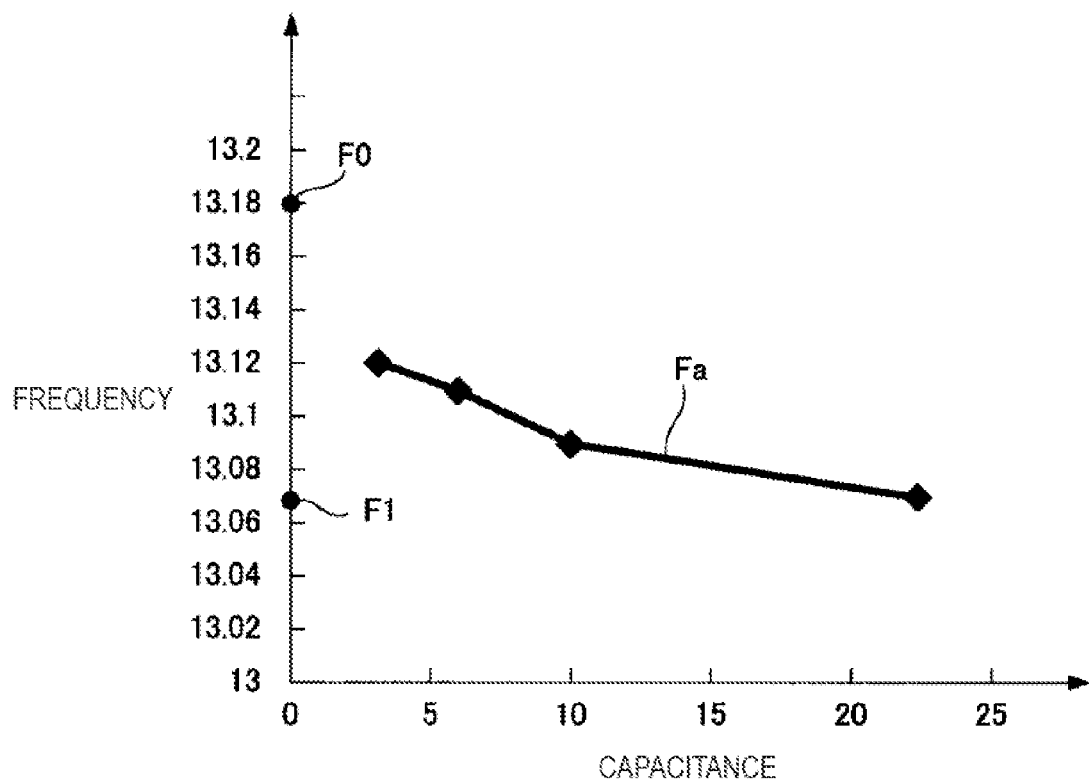
FIG. 5 is a characteristic diagram showing an example of a relation between capacitance value and frequency characteristic of a capacitor.

FIG. 5 is a diagram demonstrating the influence to the IC tag given by the capacitance value by the capacitor between the IC tag and the external circuit when an external circuit is connected to the IC tag. In FIG. 5, the vertical axis represents a resonant frequency when non-contact communication is made by the IC tag. Frequency F0 in FIG. 5 represents a resonant frequency generated by the IC tag only with no external circuit connected to the IC tag. In this example, the resonant frequency F0 with the IC tag only is 13.18 MHz.

On the other hand, frequency F1 is the resonant frequency when an external circuit (for example, the rectifier circuit 110 shown in FIG. 4) is directly connected to the IC tag without using capacitor. As demonstrated in FIG. 5, the frequency F0 with no external circuit connected to the IC tag is 13.18 MHz; on the other hand, the frequency F1 with directly connected external circuit decreases to 13.07 MHz.

Frequency characteristic Fa shown in FIG. 5 represents changes in frequency characteristic when an external circuit is connected to the IC tag via the capacitor; the characteristic at the capacitance value from 3 pF to 23 pF is shown. As demonstrated with the frequency characteristic Fa, the resonant frequency is 13.12 MHz at 3 pF; and at 6 pF, the resonant frequency is 13.11 MHz. By setting the capacitance value to a small value as 3 pF or 6 pF, change from F0 of the resonant frequency by the IC tag only is suppressed to a relatively small value.

Contrarily, when the capacitance value of the capacitor exceeds 20 pF, the resonant frequency is approximately 13.07 MHz; substantially identical to the resonant frequency F1 when the IC tag is directly connected to an external circuit without capacitor, and the effect obtained by the capacitor is eliminated.

Accordingly, the two capacitors configured by the pads 31 and 32 and the pad opposite electrodes 33 and 34 of the IC tag 10 according to the embodiment of the present disclosure have to be set to a capacitance value of at least 20 pF or less; preferably to a capacitance value of 10 pF or less.

In FIG. 5, the reason why the value of the frequency characteristic Fa with connected capacitor results in a frequency of a value slightly smaller than the resonant frequency F0 with the IC tag only is an influence of the wires connected or the like (equivalent to the extension wires 101 and 102 in FIG. 4).

2. Example of Second Embodiment

Subsequently, an example of a second embodiment of the present disclosure will be described with reference to FIG. 6-FIG. 9. In FIG. 6-FIG. 9, parts identical to the parts which have been described with respect to the example of the first embodiment (FIGS. 1-5) are given with the same reference numbers and symbols. In an IC tag of an example of the second embodiment, the position of the pad is different from the configuration of the example of the first embodiment.

[2-1. Configuration of IC Tag]

Figure 6:
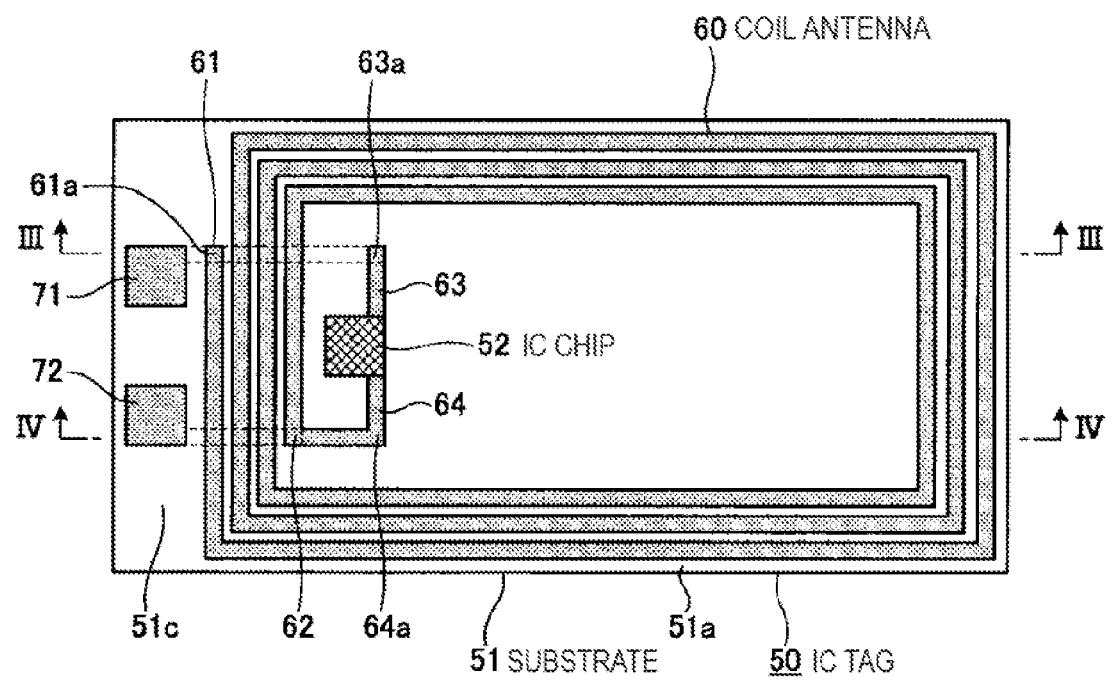
FIG. 6 is a plan view showing an example of a configuration of an IC tag according to a second embodiment of the present disclosure.
Figure 7:
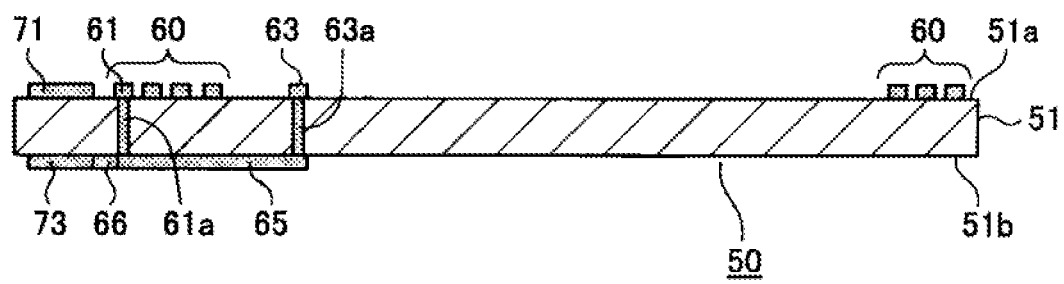
FIG. 7 is a cross-sectional view along a line III-III in FIG. 6.
Figure 8:
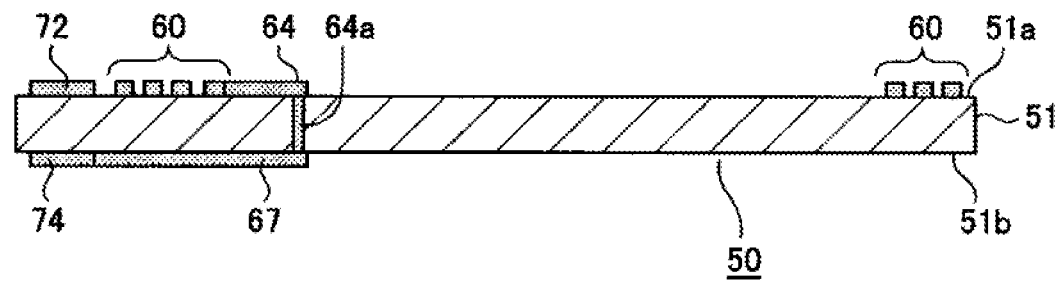
FIG. 8 is a cross-sectional view along a line IV-IV in FIG. 6.

FIG. 6 is an illustration showing an example of a configuration of an IC tag; FIG. 7 is a cross-sectional view taken along a line III-III in FIG. 6; and FIG. 8 is a cross-sectional view taken along a line IV-IV in FIG. 6.

An IC tag 50 has a coil antenna 60 having a configuration in which a conducting layer strip is disposed being laid around in a coil-like shape in an outer area of a surface 51a of a rectangular substrate 51 made of a resin material as shown in FIG. 6. A dielectric material such as an epoxy resin substrate is used for the substrate 51.

An end 61 at the outer periphery side of the coil antenna 60 is connected to a wiring pattern 65 located at a rear surface 51b side of the substrate 51 via a through hole 61a as shown in FIG. 7. The wiring pattern 65 at the rear surface 51b side is connected to a wiring pattern 63 formed in an inner area of the coil antenna 60 on the surface 51a via another through hole 23a.

Also, an end 62 at the inner side of the coil antenna 60 is connected to a wiring pattern 64 as shown in FIG. 6.

Wiring patterns 63 and 64 and an IC chip 52 are connected. The IC chip 52 is a chip which incorporates a circuit for carrying out processing of non-contact radio communication with a reader/writer.

In the example shown in FIG. 6, a capacitor that accumulates energy of signals obtained by receiving radio waves from the reader/writer and uses the energy as the power is not illustrated in the figure. However, for example, a capacitor used as a power source may be embedded within the IC chip 52. Or a capacitor used as a power source may be provided in a form of wiring pattern formed separated from the IC chip 52 and is connected thereto in parallel.

The IC tag 50 as an example of the embodiment includes an external circuit connection part. That is, a substrate extension part 51c is provided to the surface 51a of the substrate 51 at the outer side than the coil antenna 60 as shown in FIG. 6, and on the surface of the substrate extension part 51c, pads 71 and 72 each used as an electrode part to be connected to an external circuit are disposed. Each of the pads 71 and 72 is formed in a generally square conductive pattern of a predetermined area as shown in FIG. 6, but the pads 71 and 72 are not directly connected to any other wiring pattern on the surface of the substrate 51.

A pad opposite electrode 73 is provided to the rear surface 51b of the substrate 51 opposite to the pad 71 as shown in FIG. 7. Also, a pad opposite electrode 74 is provided to the rear surface 51b of the substrate 51 opposite to the pad 72 as shown in FIG. 8.

Each of the pad opposite electrodes 73 and 74 is a conductive pattern which has area and shape generally identical to those of the pads 71 and 72.

The pad opposite electrode 73 at the rear surface 51b side is connected to the wiring pattern 65 via the wiring pattern 66 at the rear surface side as shown in FIG. 7. As described above, the wiring pattern 65 on the rear surface is connected to the wiring pattern 63 at the surface side via the through hole 63a.

Also, the pad opposite electrode 74 at the rear surface 51b side is connected to the wiring pattern 67 at the rear surface side and the wiring pattern 67 is connected to the wiring pattern 64 at the surface side via the through hole 64a as shown in FIG. 8.

Therefore, the pad opposite electrodes 73 and 74 are in a conduction state with the wiring patterns 63 and 64 attached with the IC chip 52.

Being configured as described above, the pad 71 and the pad opposite electrode 73 are disposed being opposite to each other and being interposed by the substrate 51 of a dielectric material as shown in FIG. 7. Also, the pad 72 and the pad opposite electrode 74 are disposed being opposite to each other and being interposed by the substrate 51 of a dielectric material as shown in FIG. 8. Here, since the substrate 51 is a dielectric substrate, a capacitor is formed by the pad 71 and the pad opposite electrode 73 being opposite to each other and being interposed by the substrate 51. Likewise, a capacitor is formed by the pad 72 and the pad opposite electrode 74 being opposite to each other and being interposed by the substrate 51.

Each of the two capacitors formed by the pads 71 and 72 and the pad opposite electrodes 73 and 74 is a capacitor having a minute capacitance of 3 pF, 6 pF or so, at most 20 pF or less same as the first embodiment. The reason why the capacitance value of the capacitor is thus set to 20 pF or less is based on frequency characteristic which has been described with respect to the example of the first embodiment in FIG. 5.

The pads 71 and 72, which are external circuit connection parts, are connected to the coil antenna 60 being interposed by capacitors each having a minute capacitance.

[2-2. Configuration of Terminal Apparatus Mounted with IC Tag]

Now, referring to FIG. 9, a configuration of a terminal apparatus 100 connected to the IC tag 50 will be described below.

Figure 9:
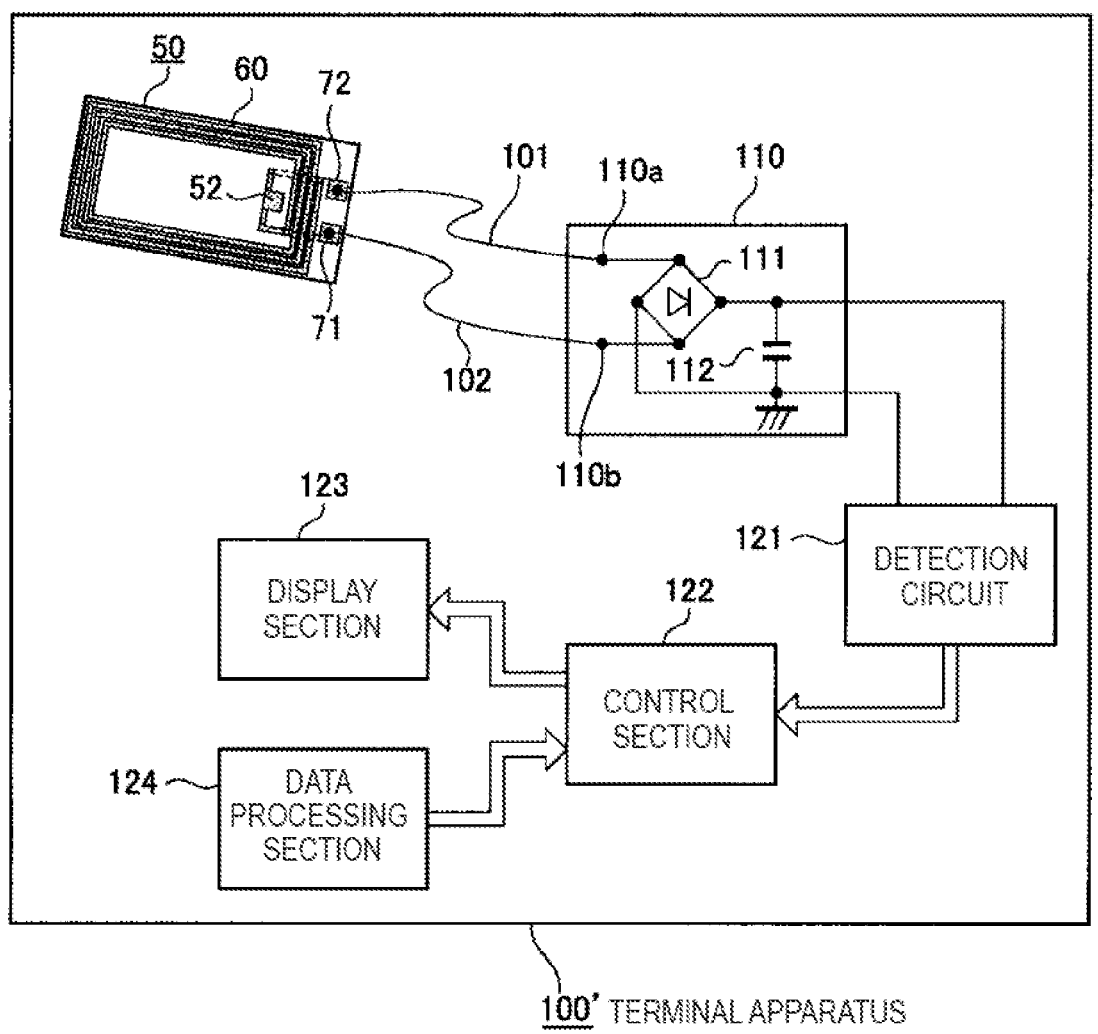
FIG. 9 is a configuration diagram showing an example of a terminal apparatus according to the second embodiment of the present disclosure.
Figure 10:
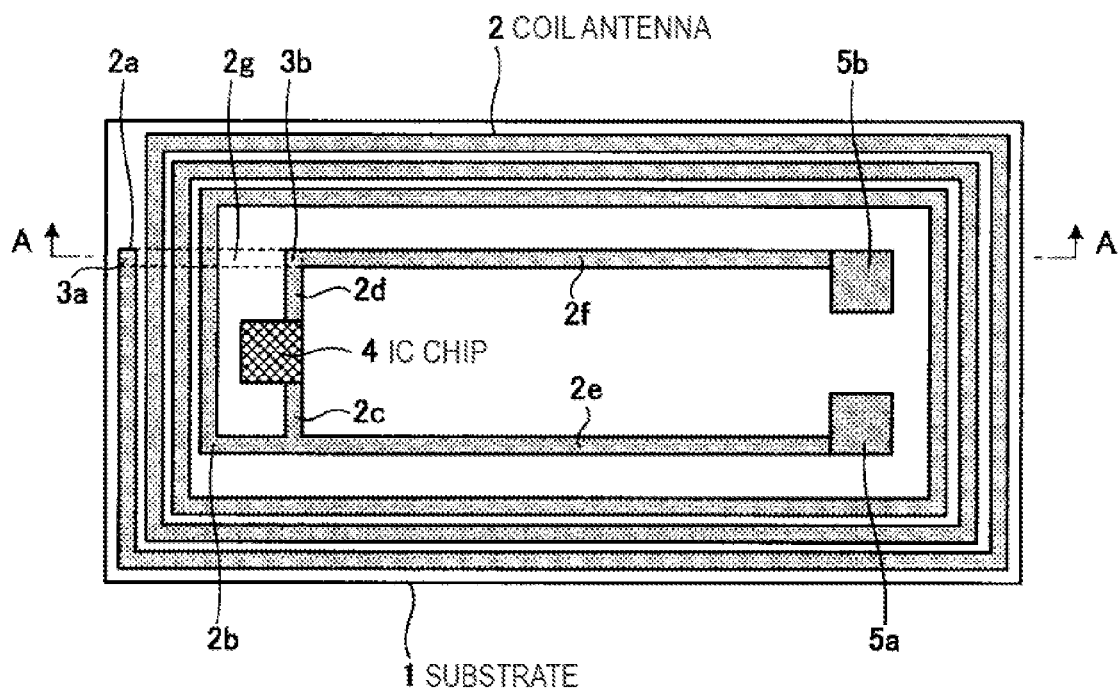
FIG. 10 is a plan view showing an example of a configuration of a conventional IC tag.
Figure 11:
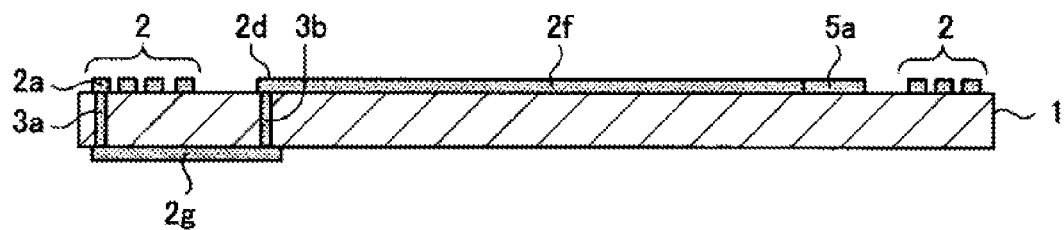
FIG. 11 is a cross-sectional view taken along a line A-A in FIG. 10.

Each of the pads 71 and 72 of the IC tag 50 is connected to input terminals 110a and 110b of a rectifier circuit 110 via extension wires 101 and 102 respectively as shown in FIG. 9. The pads 71 and 72 and the extension wires 101 and 102 are, for example, soldered to connect to each other. The configuration and the operation of the terminal apparatus 100' from the rectifier circuit 110 are identical to the configuration and the operation of the terminal apparatus 100 with respect to the example of the first embodiment shown in FIG. 4.

In the case of the example of the IC tag 50 according to the embodiment shown in FIG. 9, since the pads 71 and 72, which are external circuit connection parts, are disposed at the outside of the coil antenna 60, the extension wires 101 and 102 do not cross the coil antenna 60. Accordingly, the extension wires 101 and 102 can be reduced.

In the case of the example of the second embodiment also, same as the example of the first embodiment, each of the pads 71 and 72 of the IC tag 50 functions as a capacitor respectively. Therefore, when connecting to the circuit of the terminal apparatus as the external circuit, capacitors for separating the IC tag 10 from the external circuit are eliminated. Accordingly, the terminal apparatus (electronic apparatus) connected to the IC tag is configured simply.

3. Modification

In the above described examples of the embodiments, particular examples of the terminal apparatus to be mounted with the IC tag are not given, but the IC tag is applicable to various electronic apparatuses including an IC tag. For example, by applied to a mobile phone terminal apparatus, the mobile phone terminal apparatus is capable of processing of display and power-on corresponding to the communication status on the IC tag.

Configurations of the coil antenna and conductive patterns are given just as a preferable example; therefore other configuration may be adopted.

Additionally, the present technology may also be configured as below.

(1) An IC tag, including:
a substrate made of a dielectric material;
an antenna pattern disposed on a surface of the substrate;
a communication circuit chip connected to one end and other end of the antenna pattern on the substrate surface, which performs transmission processing and/or reception processing of a radio signal; and
external circuit connection parts connected to the antenna pattern in a vicinity of the one end and the other end thereof on the surface or a rear surface of the substrate, in which a conductive part having a predetermined area opposes to other conductive part having a predetermined area on an opposed surface at an opposite side of the substrate, and the conductive part on the opposed surface at the opposite side is formed as a pad to be connected to an external circuit.

(2) The IC tag according to (1), wherein a capacitance obtained by conductive parts of the external circuit connection parts each having a predetermined area opposing to each other is set to a capacitance of 20 pF or less for galvanically-isolating a circuit formed by the communication circuit chip and the antenna pattern from the external circuit.

(3) The IC tag according to (1) or (2), wherein the pads of the external circuit connection parts are disposed on the substrate at an inner side of the antenna pattern.

(4) The IC tag according to (1) or (2), wherein the pads of the external circuit connection parts are disposed on the substrate at an outer side of the antenna pattern.

(5) An electronic apparatus including:
an IC tag which includes:
a substrate made of a dielectric material;
an antenna pattern disposed on a surface of the substrate;
a communication circuit chip connected to one end and other end of the antenna pattern on the substrate surface, which performs transmission processing and/or reception processing of a radio signal; and
external circuit connection parts connected to the antenna pattern in a vicinity of the one end and the other end thereof on the surface or a rear surface of the substrate, in which a conductive part having a predetermined area opposes to other conductive part having a predetermined area on an opposed surface at an opposite side of the substrate, and the conductive part on the opposed surface at the opposite side is formed as a pad to be connected to an external circuit;

a rectifying section connected to the pads of the IC tag for rectifying signals obtained via the pads; and a detection section that detects the signal rectified by the rectifying section.

(6) The electronic apparatus according to (5), further including a control section that causes a power source to turn on based on a trigger signal outputted by the detection section when the signal rectified by the rectifying section exceeds a predetermined level.

(7) The electronic apparatus according to (5) or (6) further including a display section that indicates an approximation to a reader/writer based on a trigger signal outputted by the detection section when the signal rectified by the rectifying section exceeds a predetermined level.

It should be understood by those skilled in the art that various modifications, combinations, sub-combinations and alterations may occur depending on design requirements and other factors insofar as they are within the scope of the appended claims or the equivalents thereof.

What is claimed is:

1. An IC tag, comprising:
a substrate made of a dielectric material;
an antenna pattern disposed on a surface of the substrate;
a communication circuit chip connected to one end and other end of the antenna pattern, wherein the communication circuit chip performs transmission processing and/or reception processing of a radio signal; and
external circuit connection parts connected to the antenna pattern in vicinity of the one end and the other end thereof on the surface or a rear surface of the substrate, each of the external circuit connection parts comprising a first conductive part and a second conductive part facing each other and interposed by the substrate, the first conductive part being connected to the antenna pattern, the second conductive part being formed as a pad to be connected to an external circuit, wherein the external circuit connection parts galvanically isolate the communication circuit chip and the antenna pattern from the external circuit.

2. The IC tag according to claim 1, wherein a capacitance obtained by the first conductive part and the second conductive part of each of the external circuit connection parts is set to a capacitance of 20 pF or less.

3. The IC tag according to claim 1, wherein the pad of each of the external circuit connection parts is disposed on the substrate at an inner side of the antenna pattern.

4. The IC tag according to claim 1, wherein the pad of each of the external circuit connection parts is disposed on the substrate at an outer side of the antenna pattern.

5. The IC tag according to claim 1, wherein the pad is a square conductive pattern.

6. The IC tag according to claim 1, wherein the pad is a conductive pattern with a shape identical to the first conductive part.

7. The IC tag according to claim 1, wherein the dielectric material is an epoxy resin substrate.

8. The IC tag according to claim 1, wherein the antenna pattern is a conducting layer strip in a coil like shape.

9. The IC tag according to claim 1, wherein the pad is electrically isolated from a wiring pattern on the substrate.

10. An electronic apparatus comprising:
an IC tag which comprises:
a substrate made of a dielectric material;
an antenna pattern disposed on a surface of the substrate;
a communication circuit chip connected to one end and other end of the antenna pattern, wherein the communication circuit chip performs transmission processing and/or reception processing of a radio signal; and
external circuit connection parts connected to the antenna pattern in vicinity of the one end and the other end thereof on the surface or a rear surface of the substrate, each of the external circuit connection parts comprising a first conductive part and a second conductive part facing each other and interposed by the substrate, the first conductive part being connected to the antenna pattern, the second conductive part being formed as a pad to be connected to an external circuit; and
the external circuit which comprises:
a rectifying circuit connected to the pad of the IC tag for rectifying signal obtained via the pad; and
a detection circuit that detects rectified signal from the rectifying circuit, wherein the external circuit connection parts galvanically isolate the IC tag from the external circuit.

11. The electronic apparatus according to claim 10, wherein the external circuit further comprises a control section that causes a power source to turn on based on a trigger signal outputted by the detection circuit when the rectified signal exceeds a predetermined level.

12. The electronic apparatus according to claim 10, wherein the external circuit further comprises a display that indicates an approximation to a reader and/or a writer based on a trigger signal outputted by the detection circuit when the rectified signal exceeds a predetermined level.

13. The electronic apparatus according to claim 10, wherein the rectifying circuit comprises a rectifying diode bridge.

14. The electronic apparatus according to claim 10, wherein the external circuit further comprises a display to display characters and/or figures representing initiation of communication with a reader and/or a writer and progression of the communication.

* * * * *